United States Patent [19]

Chen

[11] Patent Number: 5,202,824
[45] Date of Patent: Apr. 13, 1993

[54] ROTATING FORCE GENERATOR FOR MAGNETIC BEARINGS

[75] Inventor: Hsiang M. Chen, Latham, N.Y.

[73] Assignee: Mechanical Technology Incorporated, Latham, N.Y.

[21] Appl. No.: 925,899

[22] Filed: Aug. 6, 1992

Related U.S. Application Data

[63] Continuation of Ser. No. 541,621, Jun. 21, 1990, abandoned.

[51] Int. Cl.$^5$ .................... G05B 19/02; H02K 7/09
[52] U.S. Cl. .................... 364/508; 364/576; 364/165; 310/90.5; 318/128; 318/623; 318/649
[58] Field of Search ............ 364/506, 507, 508, 576, 364/148, 158, 159, 164, 165; 73/663–665, 667, 668; 310/51, 90.5; 318/126–128, 611, 623, 628, 629, 632, 649, 460

[56] References Cited

U.S. PATENT DOCUMENTS

| | | | |
|---|---|---|---|
| 4,697,128 | 9/1987 | Matsushita et al. | 310/90.5 X |
| 4,910,449 | 3/1990 | Hiyama et al. | 310/90.5 X |
| 4,912,387 | 3/1990 | Moulds, III | 310/90.5 X |
| 4,929,874 | 5/1990 | Mizuno et al. | 310/51 X |
| 4,963,804 | 10/1990 | Geiger | 310/51 X |
| 4,989,158 | 1/1991 | Sloane | 364/508 |
| 4,992,714 | 2/1991 | Matsushita et al. | 364/508 X |
| 4,999,534 | 3/1991 | Andrianos | 310/51 X |
| 5,010,769 | 4/1991 | King et al. | 364/508 X |
| 5,012,428 | 4/1991 | Ueno et al. | 364/508 |
| 5,013,987 | 5/1991 | Wakui | 310/90.5 X |
| 5,084,643 | 1/1992 | Chen | 310/90.5 |

Primary Examiner—Parshotam S. Lall
Assistant Examiner—Thomas S. Auchterlonie
Attorney, Agent, or Firm—Kane, Dalsimer, Sullivan, Kurucz, Levy, Eisele and Richard

[57] ABSTRACT

The present invention relates to apparatus for stabilizing the operation of rotational machinery, particularly machinery which uses magnetic bearings. Accelerometers sense various vibrations within the machinery. The outputs of the accelerometers are analyzed by a Fast Fourier Transform algorithm and multiplied by an array of influence coefficients to calculate desired stabilizing forces to be applied to the rotating machinery. Compensating analog voltage signals are generated in accordance therewith and transmitted to magnetic control coils within the rotating machinery.

14 Claims, 2 Drawing Sheets

ROTATING FORCE GENERATOR FOR MAGNETIC BEARINGS

This is a continuation of copending application Ser. No. 07/541,621 filed on Jun. 21, 1990, now abandoned.

BACKGROUND OF THE INVENTION

1. Field of the Invention

This invention relates to the field of magnetic bearings and more particularly to arrangements for cancelling the vibrations, such as those caused by rotor imbalance or fluid-induced hydrodynamic forces, by means of a rotating force generator.

2. Description of the Prior Art

During the past twenty years, magnetic bearings have progressed from a laboratory curiosity to specialized, sophisticated applications such as spacecraft mechanisms, to more conventional machines such as compressors and machine tool spindles.

Magnetic bearings offer the advantages of very long life and high reliability by the elimination of wear and fatigue failure modes; by the elimination of lubrication supply and circulation systems, and by providing a way to avoid the single-point failure limitations of conventional bearing designs. Additionally, the absence of rotational frictional forces of magnetic bearings makes possible lower bearing power loss, higher accuracy pointing systems, high resolution instruments, and lighter weight gyros and momentum wheels.

All practical magnetic bearing systems constructed and operated to date have employed active servo control for at least one of the possible five degrees of freedom (i.e., x, y, z, $\Theta_x$, $\Theta_y$).

A radial magnetic bearing typically has two perpendicular or orthogonal axes, both of which are perpendicular to the axis of rotation. It is desirable that sinusoidal forces at different frequencies be generated in these axes to suppress vibrations of a machine casing on which the magnetic bearings are mounted. The sinusoidal forces on two axes of a radial bearing resulting in a rotating force are illustrated by an example shown in FIG. 1, along with a pair of parametric equations.

In some radial magnetic bearing applications, the control systems may be extended to four degrees of freedom in order to control angular vibrations such as pitching and swaying, in addition to horizontal and vertical lateral vibrations. Typical causes of the vibrations are rotor imbalance and the hydrodynamic effect of the fluid layers surrounding the rotor. These vibrations are typically of a frequency equal to the rotational frequency of the rotor or a harmonic (i.e., an integer multiple) thereof. The vibrations are typically measured with accelerometers.

In the prior art, control of vibrations of casings where magnetic bearings are mounted is typically accomplished by manipulating each acceleration measurement separately by using high-gain and narrow band or notch filters in order to generate compensating sinusoidal forces. However, the signal manipulating procedure in the prior art requires extensive empirical trial-and-error adjustment. This trial-and-error adjustment is deficient in that the stability of the magnetic bearing control axes cannot be assured in view of the superimposition of the additional continuous feedback control signal. If these feedback control signals are improperly set or otherwise out of adjustment, the resultant instability could damage the machinery. Moreover, achieving optimal vibration control by trial-and-error is time consuming, especially when several axes of control, or degrees of freedom, with cross-coupling influences are involved.

OBJECTS AND SUMMARY OF THE INVENTION

It is therefore an object of this invention to provide a means for stabilizing the operation of a magnetic bearing while suppressing the casing vibration, particularly a radial bearing affected by rotor imbalance and the hydrodynamic effect of thin fluid layers surrounding the rotor.

It is therefore a further object of this invention to stabilize the operation of a magnetic bearing in a plurality of degrees of freedom.

It is therefore a still further object of this invention to stabilize the operation of a magnetic bearing in a quantitative manner without the need for extensive trial-and-error empirical adjustments.

These and other objects and advantages are attained by providing a rotating force generator which includes a Fast Fourier Transform (FFT) processor, a microprocessor and a composite sine wave generator.

The Fast Fourier Transform processor receives input from multiple sensors and a phase/frequency reference and provides as output the amplitude and phase of different frequency components of the measured and averaged vibrations.

The microprocessor receives initial experimental data to obtain an array of influence coefficients and subsequently uses the array of influence coefficients along with the output of the Fast Fourier Transform processor to compute compensating sinusoidal signal commands.

The composite sine wave generator receives the compensating sinusoidal signal commands from the microprocessor to generate analog sinusoidal signals with amplitudes and phases according thereto. A summing amplifier for each of the control axes receives the corresponding analog control signal and the conditioned output of a corresponding displacement sensor. The output of the summing amplifier is input to power amplifiers which provide control currents to magnetic coils used to suppress the casing vibration.

BRIEF DESCRIPTION OF THE DRAWINGS

Further objects and advantages of the invention will become apparent from the following description and claims, and from the accompanying drawings, wherein:

DETAILED DESCRIPTION OF THE PREFERRED EMBODIMENT

Figure 1:
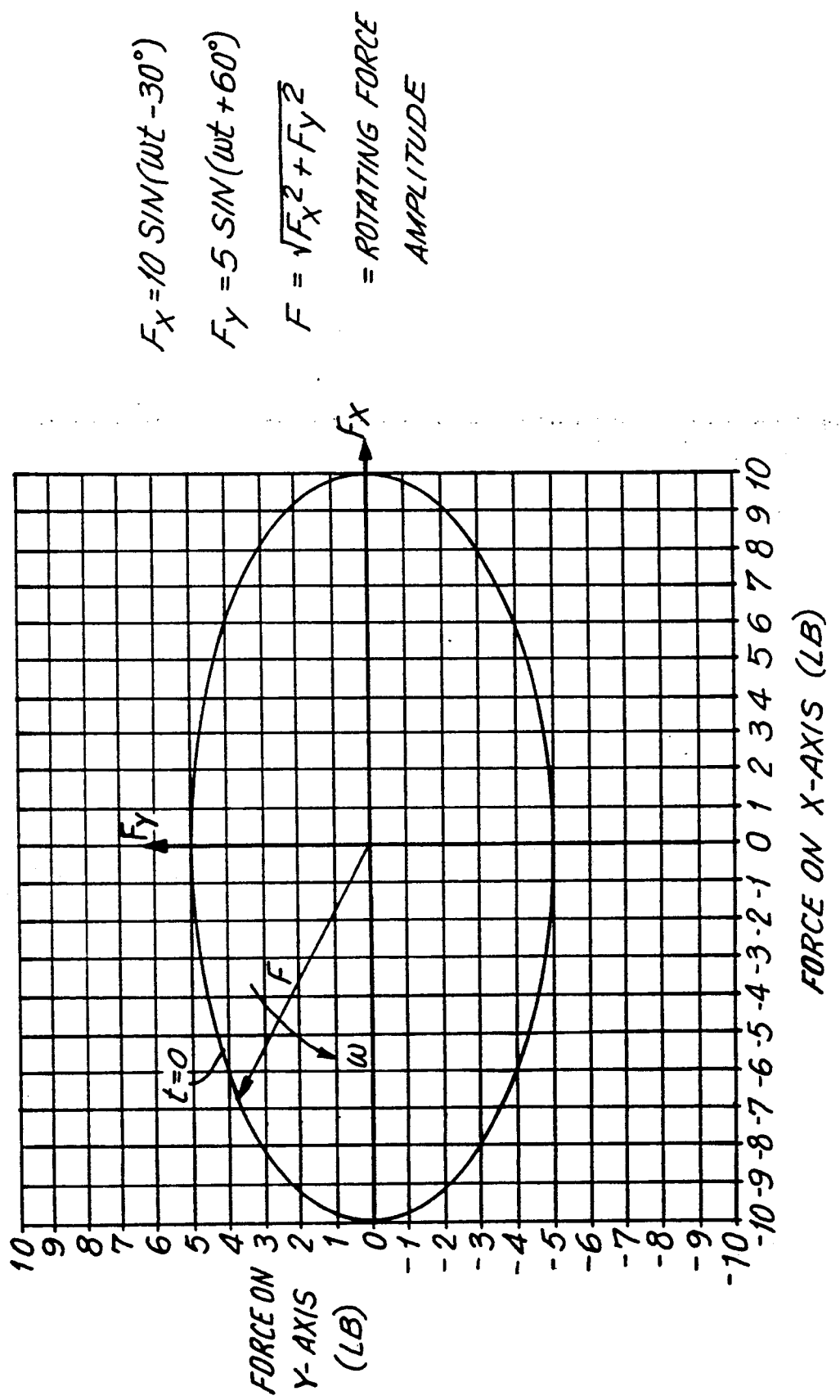
FIG. 1 discloses a diagram of the rotating force resulting from sinusoidal forces on two axes of a radial bearing such as may result if the rotor is unbalanced.
Figure 2:
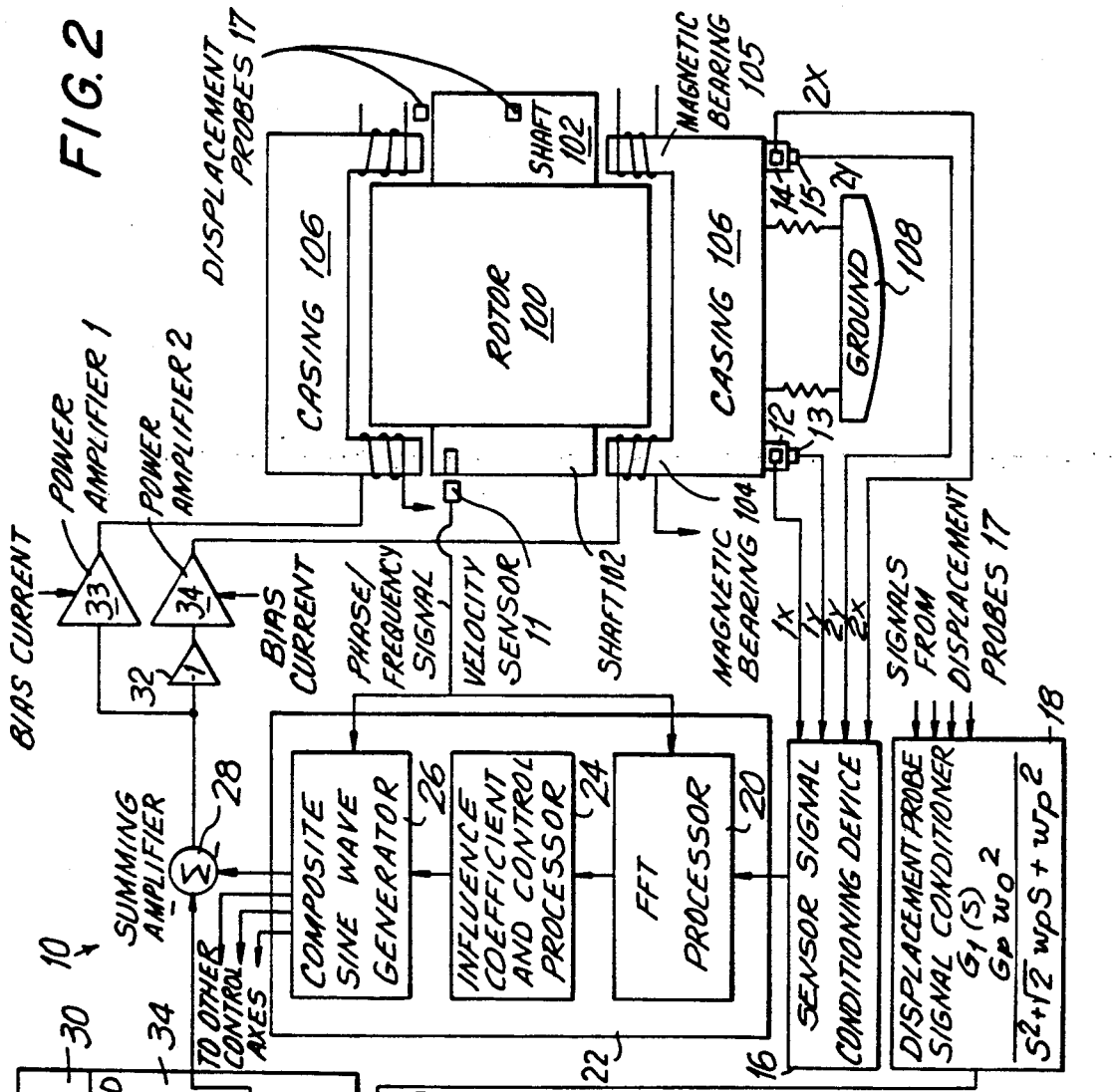
FIG. 2 is a block diagram of the rotor, stator, magnetic bearings, rotating force generator and associated electronics of the present invention.

Referring now to the drawings in detail wherein like numerals indicate like elements throughout the several views, FIG. 2 discloses block diagram of the rotor, stator, magnetic bearings, rotating force generator and associated electronics of the present invention 10.

Rotor 100 is extended to shaft 102 which is journaled for rotation upon and supported by magnetic bearings 104 and 105 which are contained within casing 106 which is, in turn, coupled to mechanical ground 108.

Casing 106 further includes velocity sensor 11 with phase/frequency reference output to monitor the rotation of rotor 100, and displacement probes 17 to provide conventional magnetic bearing control.

Accelerometer/displacement sensors 12, 13, 14, 15 are illustrated to measure the vibrations in lateral directions, i.e. horizontal and vertical, of the casing 106 at the locations of magnetic bearings 104, 105. Additional accelerometer/displacement sensors may be added to monitor angular vibrations such as pitching or swaying of casing 106. Typical causes of the vibrations are rotor imbalance and the hydrodynamic effect of thin fluid layers surrounding the rotor 100. The vibrations are typically in the frequency of rotation of rotor 100 and harmonics thereof. Moreover, in applications where suppressing rotor vibration is preferred over suppressing casing vibration, sensors may monitor rotor vibration.

The output of accelerometer/displacement sensors 12, 13, 14, 15 is fed to sensor signal conditioning device 16.

The multiple-axis output of device 16 and the output of velocity sensor 11 are received by Fast Fourier Transform (FFT) processor 20 of rotating force generator 22. FFT processor 20 provides amplitudes and phases of different frequency components of the measured and averaged vibrations. The FFT calculation is performed for all axes, either individually or simultaneously.

The output of FFT processor 20 is received by influence coefficient and control processor 24. Control processor 24 performs initial experiments to obtain an array of influence coefficients (to be described later) and subsequently uses these influence coefficients to compute sinusoidal amplitude and phase signal commands from on-line signals from the FFT processor 20.

The output of control processor 24 and the output of velocity sensor 11 are received by composite sine wave generator 26. Composite sine wave generator 26 generates analog sine signals for each control axis with amplitudes and phases according the commands from control processor 24.

The output of composite sine wave generator 26 is received as a first input to a dedicated summing amplifier 28. Summing amplifier 28 receives as a second input the output of Magnetic Bearing PID (Proportional Integration Differentiation) Control and Phase Compensation Module 30 which, in turn, has received its input from Displacement Probe Signal Conditioner Module 18 which has received its input from displacement probes 17. A typical transfer function, $G_1(s)$, including a sensitivity constant $G_p$ and a second order low-pass filter to reject any carrier frequency is illustrated for module 18. Module 30 typically includes a PID Circuit 32 and a Phase Lead Circuit 34, the typical Laplace transformations of the transfer functions of which, $G_2(s)$ and $G_3(s)$, respectively, are similarly shown in diagram form.

The output of summing amplifier 28 is received by power amplifier 33 and inverter 32. Inverter 32 inverts the output of summing amplifier 28. The output of inverter 32 is received by power amplifier 34. Additionally, substantially time-invariant bias currents are provided by power amplifiers 33, 34.

Figure 3:
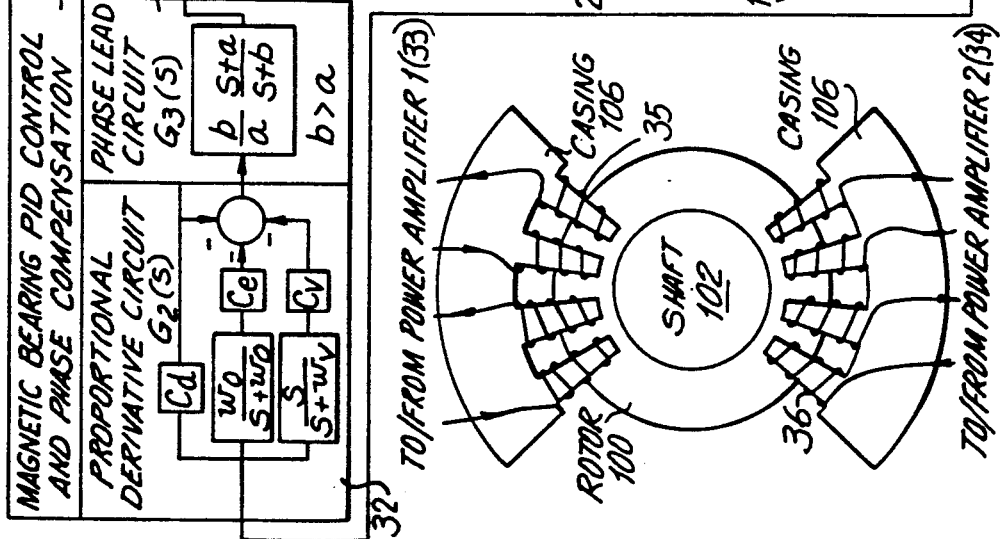
FIG. 3 is a side view of the rotor and stator of FIG. 2.

As shown in FIGS. 2 and 3, the current from power amplifiers 33, 34 is received by control coils 35, 36, respectively. The magnetic forces induced by control coils 35, 36 stabilize the operation of rotor 100 and casing 106.

Power amplifiers 33, 34 are typically pulse-width-modulated (PWM) type amplifiers because of their energy efficiency. The coil inductance of control coils 35, 36 will make the frequency response roll off for many typical applications at about 500 Hertz, similar to that of a first or second-order low-pass filter.

Therefore, the following model may be derived:

$G_a$ = power amplifier gain $w_a$ = power amplifier roll-off frequency = 500 Hertz $G_4(s) = G_a * w_a \div (s + w_a)$ = power amplifier and inductive load of elements 32–36

$i$ = current $K_i$ = current stiffness of the control coils 35, 36 (lb/A)

$K_m$ = magnetic stiffness of the bias field (lb/inch)

$Y_p$ = displacement at the probe $Y_d$ = center displacement $F$ = Force on rotor Therefore, $F = K_i i + K_m Y_d$ $i = G_1(s) G_2(s) G_3(s) G_4(s) Y_p$ To use this invention 10, the values of the elements of the influence coefficient array must be initialized.

The influence coefficient scheme of control processor 24 can be mathematically represented by the following complex matrix equation for one frequency component of the vibration:

$$[E] = [C][A]$$

where:

$[E] = [E_{1x}, E_{1y}, E_{2x}, E_{2y}]^t$ = RFG output signal vector $[C]$ = calculated influence coefficient matrix, $4 \times 4$ dimension for this example.

$[A] = [A_{1x}, A_{1y}, A_{2x}, A_{2y}]^t$ = RFG input acceleration vector

Subscripts 1 and 2 designate the bearing number While subscripts x and y refer to two perpendicular axes in the same bearing.

For the illustrated example of four control axes, [C], a four by four matrix of influence coefficients, must be experimentally determined when the machine is first adjusted for on-line operation. In order to initialize the influence coefficient array [C] prior to on-line operation, the influence coefficient and control processor 24 is programmed to output a small perturbation with arbitrary amplitude and phase to one control axis at a time. These electronic perturbation signals are transformed into mechanical perturbations of the rotor 100 and casing 106 via composite sine wave generator 26, summing amplifier 28, inverter 32, power amplifiers 33, 34, and control coils 35, 36. The resultant changes in casing vibration are sensed by the appropriate accelerometer/displacement sensor 12, 3, 14 or 15 and processed through sensor signal conditioning device 16 and FFT processor 20 and returned to influence coefficient and control processor 24. Processor 24, using standard linear equation techniques and possibly least-squares fit[1] analysis, calculates the elements of the influence coefficient array by correlating the output perturbation with the resultant sensed change in casing vibration.

[1] should the number of influence coefficients not equal the number of bearing control axes times the number of accelerometer/displacement sensors.

For casing vibration components at different frequencies such as synchronous harmonics, a different set of influence coefficients is required for each component.

The machine casing vibrations caused by rotor imbalance etc. generally vary slowly. Therefore, there is no need to apply a continuous feedback control which can create instability in and of itself as previously described. Hence, a threshold value is preset for the magnitude of the casing vibrations. When the vibrations exceed the threshold, the control vector is programmed to be updated as follows:

$$[E]=[E_0]+[\Delta E]$$

$$[\Delta E]=[C][\Delta A]$$

where:
- $[E_0]$ = existing rotating force generator signal vector
- $[\Delta E]$ = incremental output signal vector
- $[\Delta A]$ = vibration vector above threshold Invention 10 therefore provides an apparatus which will monitor the vibrations of a casing or a rotor which employs magnetic bearings. Upon the appropriate sensing of vibrations beyond a threshold, compensating signals are generated which energize control coils to stabilize the operation of the apparatus.

Thus the several aforementioned objects and advantages are most effectively attained. Although a single preferred embodiment of the invention has been disclosed and described in detail herein, it should be understood that this invention is in no sense limited thereby and its scope is to be determined by that of the appended claims.

What is claimed is:

1. An apparatus for stabilizing rotational machinery, comprising:
   sensing means coupled to the rotational machinery for detecting vibrations of the rotational machinery;
   a feedforward processing means response to said sensing means for calculating amplitude and phase information of at least one frequency component of said vibrations, said processing means including determining means for periodically determining if said amplitude information exceeds a predetermined threshold, said processing means further including updating means, responsive to said determining means, for updating an array of output of said information only when said predetermined threshold is exceeded;
   a calculating means to calculate signals from said amplitude and phase information to compensate for said vibrations;
   said calculating means including means for outputting experimental signals and calculating an array of coefficients from a response to said experimental signals and means for multiplying said array of coefficients by said array of output from said processing means;
   generating means to generate said signals in said analog form; and
   magnetic coils within the rotational machinery controlled to stabilize said rotational machinery by said signals in analog form.

2. The apparatus of claim 1 wherein said processing means includes Fast Fourier Transform means.

3. The apparatus of claim 2 further including a phase and frequency sensor within said rotating machinery and wherein said Fast Fourier Transform means is responsive to said phase and frequency sensor.

4. The apparatus of claim 2 further including means for subtracting substantially instantaneous displacements of the rotational machinery from said signals in analog form.

5. The apparatus of claim 4 further including means for amplifying output of said means for subtracting.

6. The apparatus of claim 5 further including means for inverting and amplifying output of said means for subtracting in parallel with said means for amplifying.

7. The apparatus of claim 6 wherein output from said means for amplifying and output from said means for inverting and amplifying are transmitted to diametrically opposed magnetic control coils within said rotating machinery.

8. An apparatus for stabilizing rotational machinery bearings, comprising:
   sensing means coupled to the rotational magnetic bearings for detecting vibrations of the rotational magnetic bearings;
   a feedforward processing means responsive to said sensing means for calculating amplitude and phase information of at least one frequency component of said vibrations, said processing means including determining means for periodically determining if said amplitude information exceeds a predetermined threshold, said processing means further including updating means, responsive to said determining means, for updating an array of output of said information only when said predetermined threshold is exceeded;
   a calculating means to calculate signals from said amplitude and phase information to compensate for said vibrations;
   said calculating means including means for outputting experimental signals and calculating an array of coefficients from a response to said experimental signals and means for multiplying said array of coefficients by said array of output from said processing means;
   generating means to generate said signals in said analog form; and
   magnetic coils within the rotational magnetic bearings controlled to stabilize said rotational magnetic bearings by said signals in analog form.

9. The apparatus of claim 8 wherein said processing means includes Fast Fourier Transform means.

10. The apparatus of claim 9 further including a phase and frequency sensor within said rotational magnetic bearings and wherein said Fast Fourier Transform means is responsive to said phase and frequency sensor.

11. The apparatus of claim 9 further including means for subtracting substantially instantaneous displacements of a rotor rotating within the rotational magnetic bearings from said signals in analog form.

12. The apparatus of claim 11 further including means for amplifying output of said means for subtracting.

13. The apparatus of claim 12 further including means for inverting and amplifying output of said means for subtracting in parallel with said means for amplifying.

14. The apparatus of claim 13 wherein output from said means for amplifying and output from said means for inverting and amplifying are transmitted to diametrically opposed magnetic control coils adjacent to said rotating magnetic bearings.

* * * * *